United States Patent
Parmelee et al.

(10) Patent No.: US 6,942,476 B2
(45) Date of Patent: Sep. 13, 2005

(54) METHOD AND APPARATUS FOR CHANGING TIRE IDENTIFICATION MEANS VIA MAGNETIC INSERTS

(75) Inventors: James Richard Parmelee, Stow, OH (US); Robert John Plesz, Fayetteville, NC (US); Richard Louis Fisher, Fayetteville, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 307 days.

(21) Appl. No.: 10/222,601

(22) Filed: Aug. 15, 2002

(65) Prior Publication Data

US 2004/0032053 A1 Feb. 19, 2004

(51) Int. Cl.$^7$ ................................................ B29C 33/16
(52) U.S. Cl. ........................ 425/3; 425/28.1; 425/195; 425/DIG. 33; 249/103
(58) Field of Search ............................ 425/3, 28.1, 35, 425/195, DIG. 33; 249/103

(56) References Cited

U.S. PATENT DOCUMENTS

| | | | | |
|---|---|---|---|---|
| 1,567,402 A | * | 12/1925 | Venn | 425/35 |
| 1,969,083 A | * | 8/1934 | Lawson | 425/28.1 |
| 2,296,016 A | * | 9/1942 | Bostwick | 425/28.1 |
| 2,770,013 A | * | 11/1956 | Crooker | 425/3 |
| 2,808,621 A | * | 10/1957 | Torrey, Jr. | 425/3 |
| 3,530,022 A | | 9/1970 | Mallory | |
| 3,734,448 A | * | 5/1973 | Rusk et al. | 249/103 |
| 4,010,354 A | | 3/1977 | Apicella, Jr. et al. | |
| 4,098,935 A | | 7/1978 | Knudsen | |
| 4,343,342 A | * | 8/1982 | McDonald | 152/523 |
| 4,547,139 A | * | 10/1985 | Hershberger | 425/28.1 |
| 4,625,101 A | | 11/1986 | Hinks et al. | |
| 4,684,431 A | | 8/1987 | Shurman et al. | |
| 4,973,234 A | | 11/1990 | Swenson | |
| 5,160,383 A | | 11/1992 | Gartland et al. | |
| 6,149,060 A | * | 11/2000 | Meadows | 235/462.01 |
| 6,220,333 B1 | | 4/2001 | Cantwell | |
| 6,315,539 B1 | | 11/2001 | Yutronkie et al. | |

FOREIGN PATENT DOCUMENTS

| | | |
|---|---|---|
| EP | 1 147 873 A | 10/2001 |
| JP | 59055730 | 3/1984 |
| JP | 5-237878 | * 9/1993 |

OTHER PUBLICATIONS

European Search Report mailed Nov. 24, 2003.

* cited by examiner

*Primary Examiner*—James P. Mackey
(74) *Attorney, Agent, or Firm*—Brouse McDowell; Roger D. Emerson; Heather M. Barnes (57) ABSTRACT

The present invention comprises a mold having a wall with a recess defined therein and magnetic means, wherein an associated insert is adapted to be selectively held within the recess via the magnetic means, such that the insert is substantially flush with the wall. Using the magnetic inserts in both the upper and lower mold halves results in a tire identification number being imprinted on both sides of a tire during a curing cycle. The inserts are easily and quickly changed so that down time during production is minimized, tire appearance is improved, and eliminates tire scrap.

14 Claims, 8 Drawing Sheets

METHOD AND APPARATUS FOR CHANGING TIRE IDENTIFICATION MEANS VIA MAGNETIC INSERTS

I. BACKGROUND OF THE INVENTION

A. Field of Invention

This invention pertains to the art of methods and apparatuses for quickly and easily changing tire identification means in a mold, namely a tire mold. More specifically, the present invention relates to those methods and apparatuses that enable tire identification magnetic inserts to be quickly changed in both an upper mold half and a lower mold half in the curing press in between curing cycles.

B. Description of the Related Art

The United States Department of Transportation requires that tire identification numbers ("TINs") be imprinted on the sidewall of a tire. Such information typically includes the recommended tire pressure, the manufacturer identification number, and the date the tire was fabricated (typically the year and the week of production). Therefore, the means for imprinting the information on the tire sidewall needs to be changed at least on a weekly basis.

Figure 1:
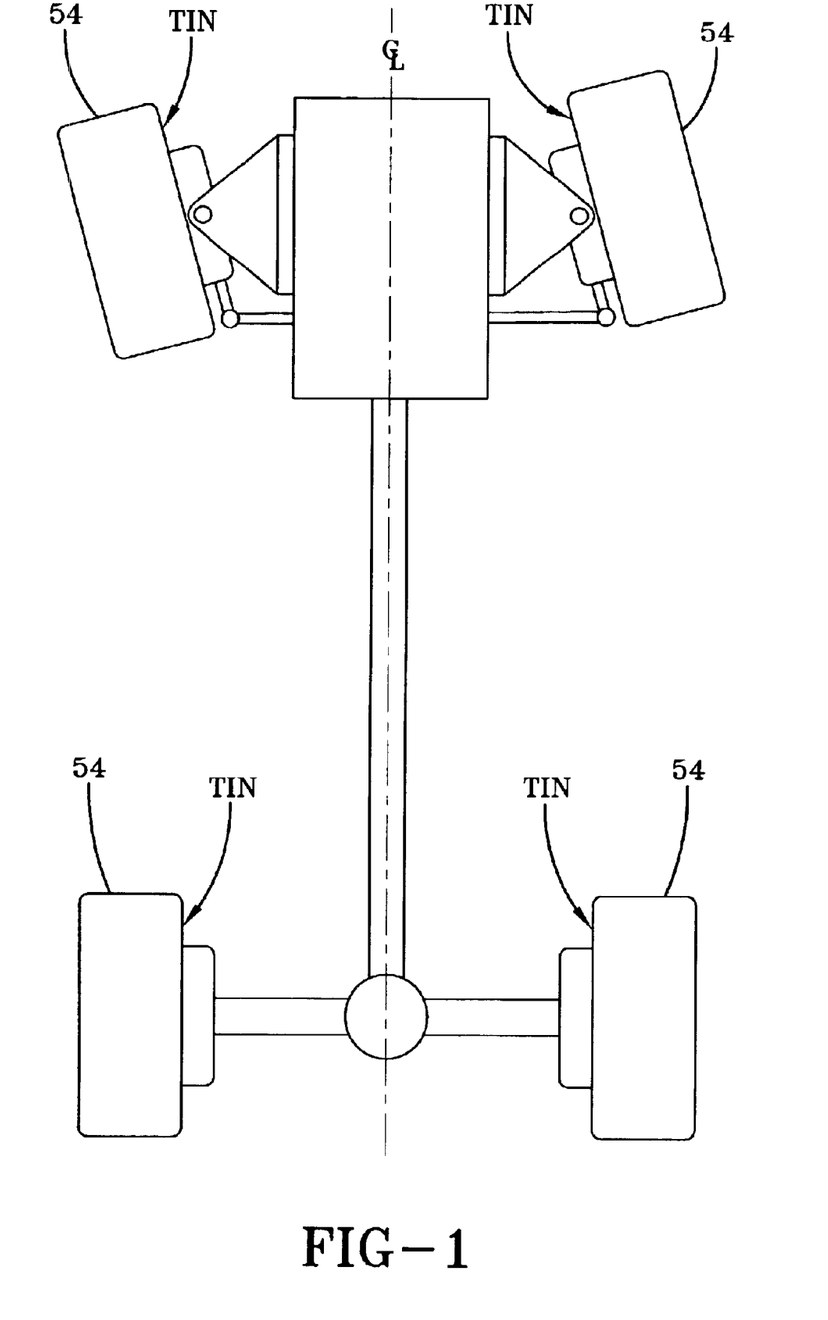
FIG. 1 is top schematic view of a vehicle showing the center longitudinal axis.

Historically, the TIN is placed on only one sidewall of the tire. Typically, the sidewall with the TIN is mounted on a vehicle to face inward, that is, toward the vehicle and away from easy view by a consumer. More specifically, the sidewall with the TIN is typically mounted to face toward the center longitudinal axis of the vehicle, as shown in FIG. 1. In the case of a tire mold, the TIN is typically positioned in the lower mold half which is the mold half mounted to the lower portion of the tire press. Thus, the lower mold half is positioned with a generally horizontal orientation and relatively close to the floor. Changing TINs has been relatively easy because the lower mold half is readily accessible by an operator.

Currently, the TINs are located on inserts or tags and are usually changed on a weekly basis in between tire curing cycles. These inserts are made from aluminum and are press-fit within the recess of the mold. What is meant by "press-fit" is that the metal of the insert contacts the metal of the recess with zero clearance. To achieve the press-fit, a nylon punch is utilized to make the insert flush with the surface of the mold. The nylon punch does not damage the data formed on the insert. Often, the inserts are not flush with the mold surface and/or they are positioned in a crooked manner. As such, the inserts often need to be removed and reinserted, which takes time and ultimately impacts productivity. Further, if inserts are not properly seated, they can fall out or be positioned in a crooked manner, which could result in defective tire appearance or a scrapped tire. A steel punch and hammer is utilized to disengage the insert from the tire mold. An operator can spend several minutes attempting to pry out the insert from the tire mold sidewall.

Anticipated changes in the United States law may soon require that TINs be visible on both tire sidewalls so that tire information is readily available regardless of which side of the tire is facing inward. This means that TINs will need to be changed on the upper mold half as well as the lower mold half. There are problems with changing TINs in upper mold halves because under known technology, only after the mold is removed can the operators access it to change the TIN. This requires time to allow the mold to cool and additional time to remove the mold from the tire press. Because a tire plant could have many tire presses, significant production time is lost while the TINs in the upper mold halves are changed.

As such, there is a need in the art for a method and apparatus that provide for easy and quick changing of TINs regardless of which side of the tire sidewall they are to be imprinted on.

II. SUMMARY OF THE INVENTION

The present invention includes a mold having a wall with a recess defined therein and magnetic means, wherein an associated insert is adapted to be selectively held within the recess via the magnetic means, such that the insert is substantially flush with the wall. Accordingly, it is an object of the present invention to provide a tire mold with accompanying recesses and inserts, which are easily and quickly changed so that curing cycles are not greatly diminished over time.

It is yet another object of the present invention to provide an article wherein the magnetic means is at least one magnet operatively connected to the wall.

It is yet another object of the present invention to provide an article, wherein the magnetic means further comprises data integrally formed therewith where the data is adapted to be imprinted into an associated vulcanizable material.

Further, another object of the present invention is to provide an article, wherein the mold comprises an upper half and a lower half, such that each mold half has the recess with magnetic means to receive the insert.

Still yet, another object of the present invention is to provide an article wherein the insert is positioned in the upper mold half and is removable through an elongated handle having a magnetized end.

Further, another object of the present invention is to provide an article wherein the insert is made from a magnetic material.

Another object of the present invention is to provide an article wherein the mold is a tire mold.

It is yet another object of the present invention to provide a tire mold system for molding a tire identification number onto a tire comprising a tire mold having a sidewall with an elongated recess defined therein where the recess has an edge and a depth; magnets operatively connected to the sidewall within the recess; and an insert selectively and interchangeably connectable to the sidewall via the magnets where the insert has a depth substantially equal to the depth of the recess, such that the insert is flush with the edge of the recess when the insert is positioned in the recess.

It is yet another object of the present invention to provide a tire mold where the recess in the sidewall has a hole defined therein.

It is yet another object of the present invention to provide a tire mold wherein the hole in the recess receives the magnet.

Further, another object of the present invention is to provide a tire mold, wherein the recess is elongated and arcuate.

Further, another object of the present invention is to provide a tire mold where the recess has two holes wherein each hole receives a magnet.

Further, another object of the present invention is to provide a method for molding data onto a vulcanizable material comprising the steps of providing a mold having a sidewall with a recess defined therein, magnetic means, and an insert having a negative image of the data integrally formed on the insert; selectively securing the insert into the recess via the magnetic means, such that the insert is substantially flush with the sidewall; closing the mold;

curing the vulcanizable material; and imprinting the data onto the vulcanizable material.

It is yet another object of the present invention to provide a method wherein the mold has an upper mold half and a lower mold half wherein each of the mold has a magnetized recess for receiving the insert, such that the method further comprises the steps of imprinting the data on the insert positioned in the upper mold half on one side of the vulcanizable material and imprinting the data on the insert positioned in the lower mold half on another side of the vulcanizable material.

It is yet another object of the present invention to provide a method comprising the steps of providing a handle with a magnetized end and a light; and removing the insert from the recess of the upper mold and/or the lower mold with a magnetized end of the material.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Referring now to the drawings wherein the showings are for purposes of illustrating a preferred embodiment of the invention only and not for purposes of limiting the same, FIGS. 1–10 illustrate the present invention.

Figure 2:
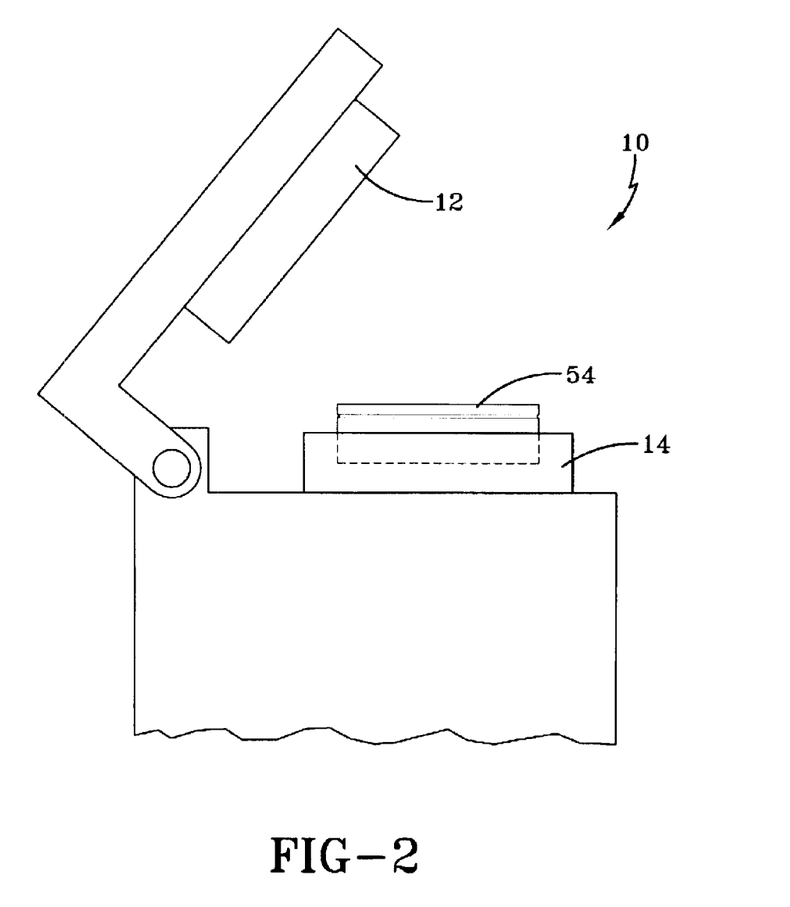
FIG. 2 is a schematic view of a tire press.

FIG. 2 illustrates a tire press having a two-piece tire mold 10 with an upper mold half 12 and a lower mold half 14. Generally, the two-piece tire mold 10 is made from aluminum or steel. The invention is also applicable to segmented molds, as will be discussed below. As is commonly known in the art, the mold 10 is adapted to receive a "green" tire, that is, a tire formed of vulcanizeable material. Vulcanization within the tire press results in a cured tire 54.

Figure 3:
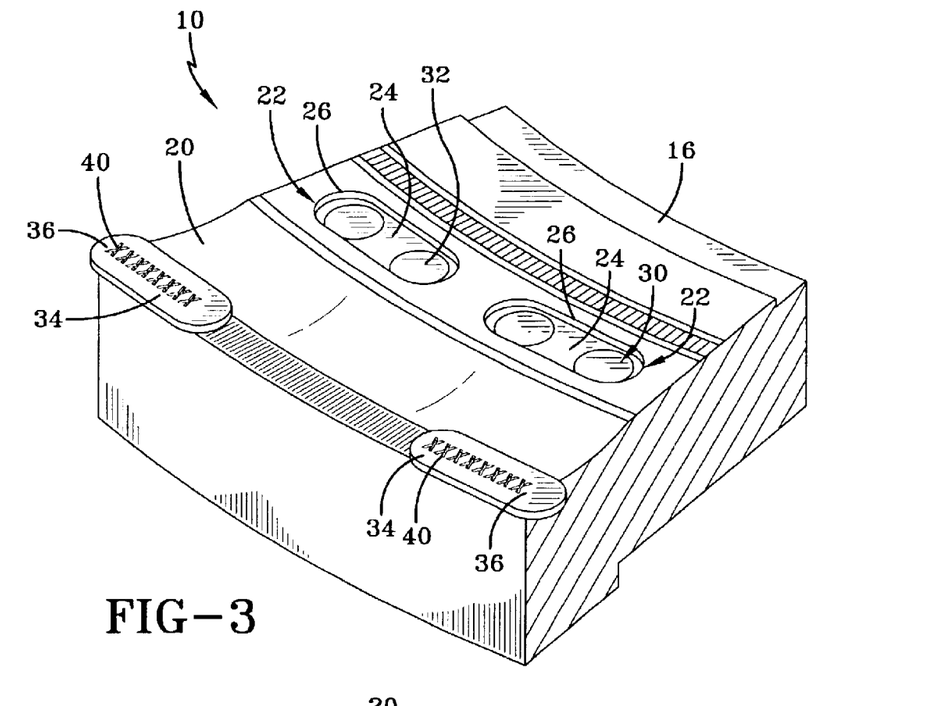
FIG. 3 is a sectional perspective view of the present invention showing the cavity side of a tire mold half having magnetized recesses and inserts.
Figure 4:
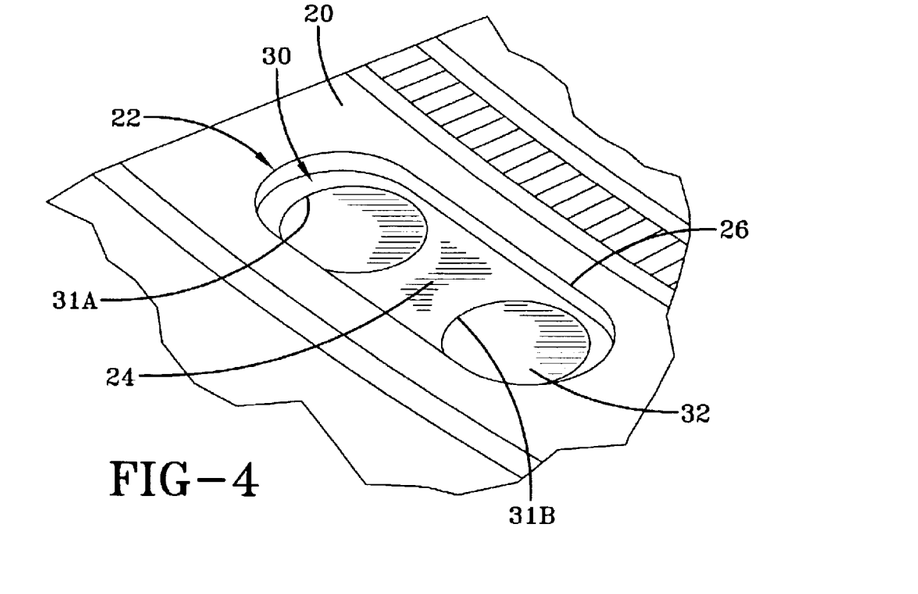
FIG. 4 is an enlarged view of the magnetic means within the recess.
Figure 5:
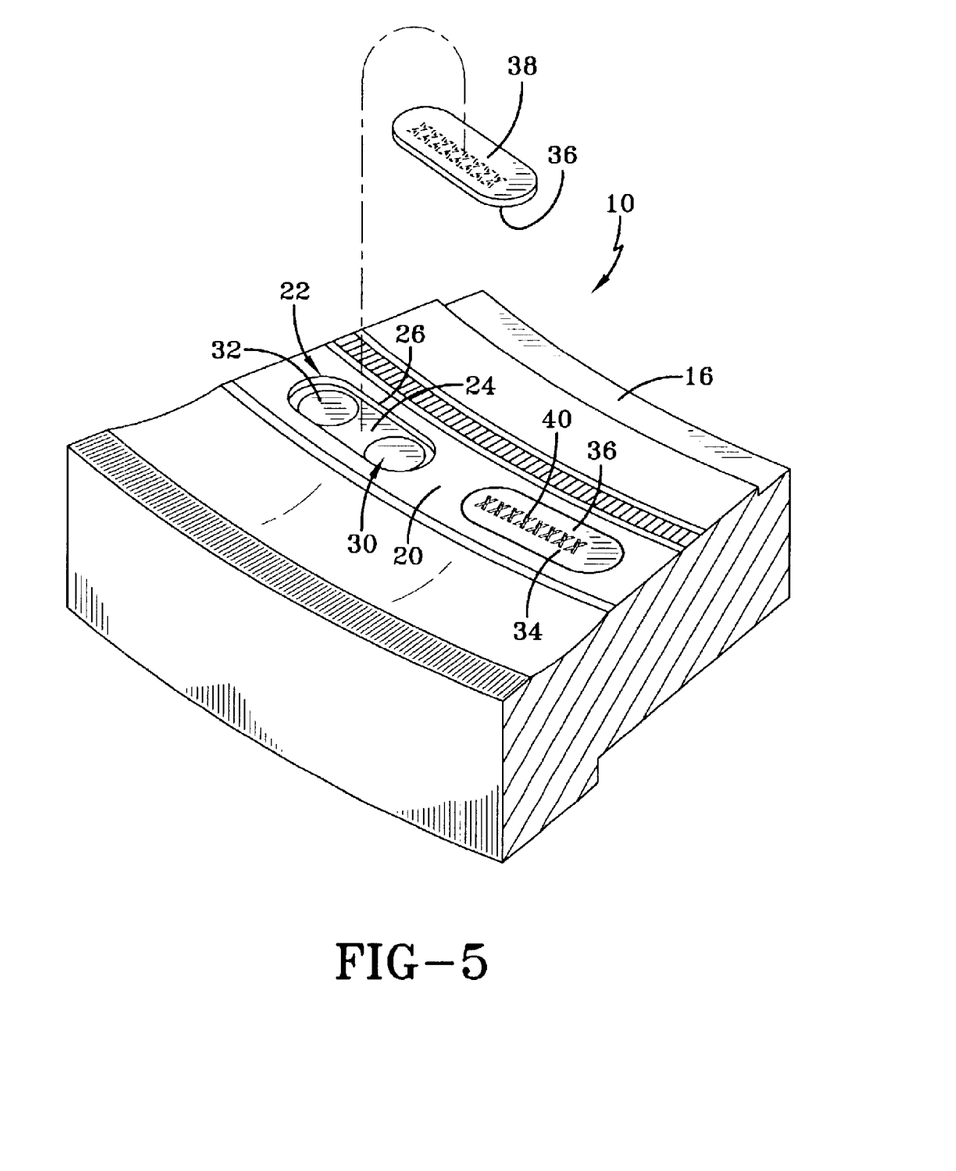
FIG. 5 is a perspective view of two recesses within a tire mold wherein one insert is positioned flush within the recess.
Figure 6:
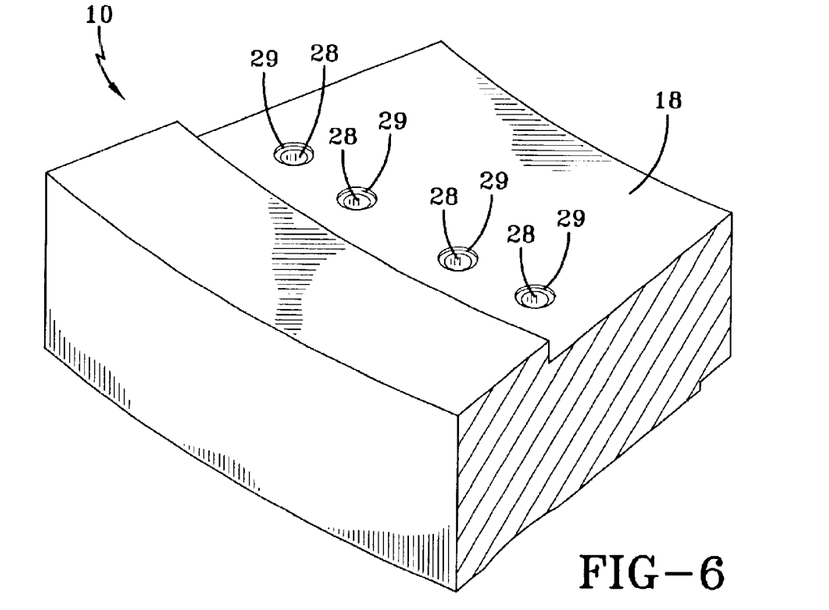
FIG. 6 is the exterior side of the mold showing the holes, which are defined in the recesses.
Figure 8:
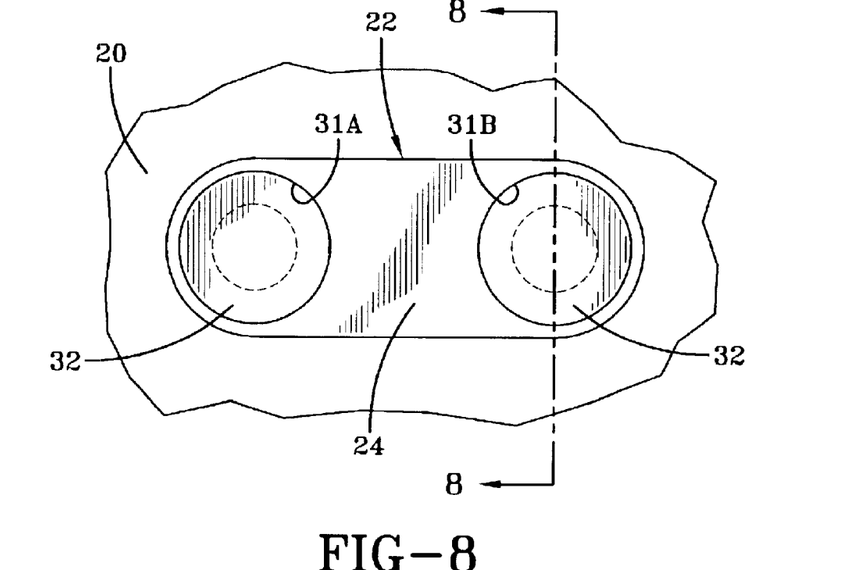
FIG. 8 is a top view of an elongated recess.
Figure 9:
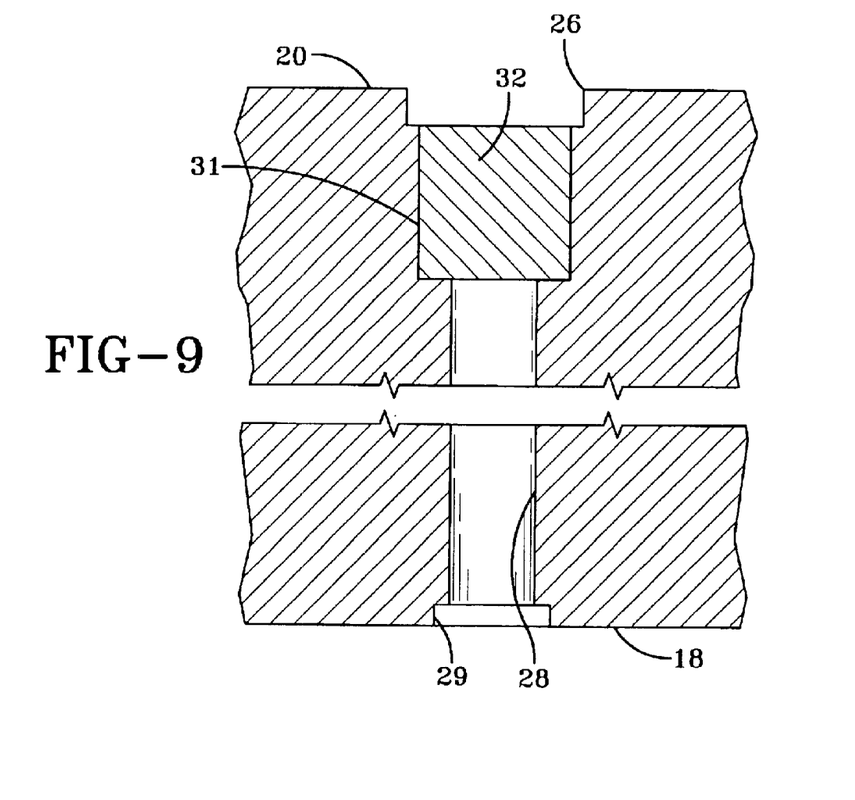
FIG. 9 is a cross-sectional view taken along line 9—9 of FIG. 8.

With reference to FIGS. 3–6, 8 and 9, sectional views of a two-piece tire mold 10 half are shown. Each tire mold half has a cavity side 16, as shown in FIGS. 3–5, and an exterior side 18, best seen in FIG. 6. The tire mold 10 half has a sidewall 20 with a recess 22 defined therein. The recess 22 may be precision machined or through any other method chosen with sound engineering judgment. The recess 22 shown is elongated and arcuate in shape. The arcuate shape may be substantially similar to the radius of curvature of the mold half. Each recess 22 has a recess floor 24 and a recess edge 26. As shown in the FIGURES, the recess floor 24 may include a cavity 31. The recess floor 24 shown has two cavities 31A, 31B for receiving magnetic means 30, as described in more detail below. As shown in FIGS. 8 and 9, the recess floor 24 has at least one hole 28 defined therein, which extends through the mold half to the exterior side 18. Preferably, the hole 28 is defined concentric with the cavities 31A, 31B. The exterior side 18 of the two-piece tire mold 10 also has a recess 29, which is preferably concentric with the hole 28.

With continuing reference to FIGS. 3–5, the magnetic means 30 are operatively connected to the sidewall 20, and more specifically, are received within the recess 22, and preferably within the cavities 31A, 31B such that the magnetic means are flush with the floor of the recess 22, as clearly shown in FIG. 9. Preferably, the magnetic means 30 are magnets 32. As shown in the drawings, the magnets 32 may range from 0.375 inches (0.9525 cm) to 0.5 inches (1.27 cm) in diameter. However, it is contemplated to be within the scope of the present invention that the magnets 32 be of any shape chosen with sound engineering judgment that would magnetically secure an insert 34 into the recess 22. Further, when the magnets 32 are positioned within the recess 22, it is preferred that the magnets 32 be distanced at least 0.5 inches (1.27 cm) apart to prevent interference with each other. The magnets 32 may be held within the recess 22 through high-temperature, heat-resistant glue, which is known in the art. Other means chosen in accordance with sound engineering judgment may be utilized to secure the magnets 32 to the sidewall 20. Once the magnets are positioned within the holes 28, the mold material around the recess 22 is heated so that it expands and more securely holds the magnets 32. This process is known as stacking. While the FIGURES show two magnets 32 being disposed within one recess 22, it is also contemplated to be within the scope of the present invention to use one magnet 32 within the recess 22. In the present invention, the magnets 32 are preferably made from samarium cobalt, which has high magnetic strength and can withstand high temperatures. Alternately, neodymium iron boron may be used as the magnet 32 material, which also has high magnetic strength and can withstand heat. While any material may be chosen with sound engineering judgment, it is important for the magnetic means 30 to have high magnetic strength and yet be able to withstand high temperatures, such as those encountered during a curing cycle for the tire 54.

In another embodiment, the magnetic means 30 may also take the form of a bucket or pocket housing, not shown. More specifically, it may be a steel cartridge having the magnetic means contained therein. The bucket housing has a body with a depth and may be circular, square, rectangular or any other shape in cross section. The bucket housing is adapted to hold the magnet 32 within the body. In yet another embodiment, the magnet 32 may be encased in a brass housing to shield the magnet 32, which is in turn positioned in the pocket housing. The bucket housing is threadably connected to the sidewall 20 of the two-piece tire mold 10.

With reference to FIGS. 3 and 5, two inserts 34 are shown. Each insert 34 is adapted to be selectively held within one of the recesses 22 via the magnetic means 30 such that a top surface 36 of the insert 34 is substantially flush with the top surface of sidewall 20. In order to maintain this flushness of surfaces, the thickness of the insert 34 should be substantially equal to the depth of the recess 22 measured from the recess floor 24 to the top of the recessed edge 26. The tolerances should be no more than +0.003 inches (0.762 mm) in order for the insert 34 to remain in the recess 22 during repeated curing cycles. This also prevents the vulcanizable material from flashing. The top surface 36 of the insert 34 may include data 40, which will be imprinted into the vulcanizable material, that is, the tire sidewall. Generally, the data 40 is information mandated by the United States Department of Transportation rather than other indicia. However, the inserts 34 of this invention could be used to imprint any kind or type of information. A bottom surface 38 of the insert 34 faces the magnetic means 30. The insert 34 is made from a magnetic material, and preferably is a 410 or 416 stainless steel, which provide for superior magnetic properties. Alternately, cold-rolled steel or any other material with magnetic properties may be utilized. Since one of the objects of the present invention is to maintain the insert within the recess 22 of the mold halves 12, 14 after the mold 10 is opened, it is important that the insert 34 itself not be magnetized. If the insert 34 was magnetized, a magnetic force between the insert 34 and the tire bead (not shown) could result in a magnetic force strong enough to remove the insert 34 from the recess 22. Further, this could result in the insert 34 being formed within the vulcanized tire, which is not desired. Because the data 40 will be imprinted into the vulcanizable material, the insert 34 should also be engravable.

The insert 34 can easily be removed from and inserted into a recess 22 and yet remain secure within the recess 22 throughout numerous curing cycles. If the magnetic means 30 need to be removed from the mold, an elongated object, such as a rod, may be inserted into the hole 28 to force out the magnetic means 30 through the recess 22. Of course other means of removing the magnetic means 30 chosen with sound engineering judgment may also be used.

Figure 7:
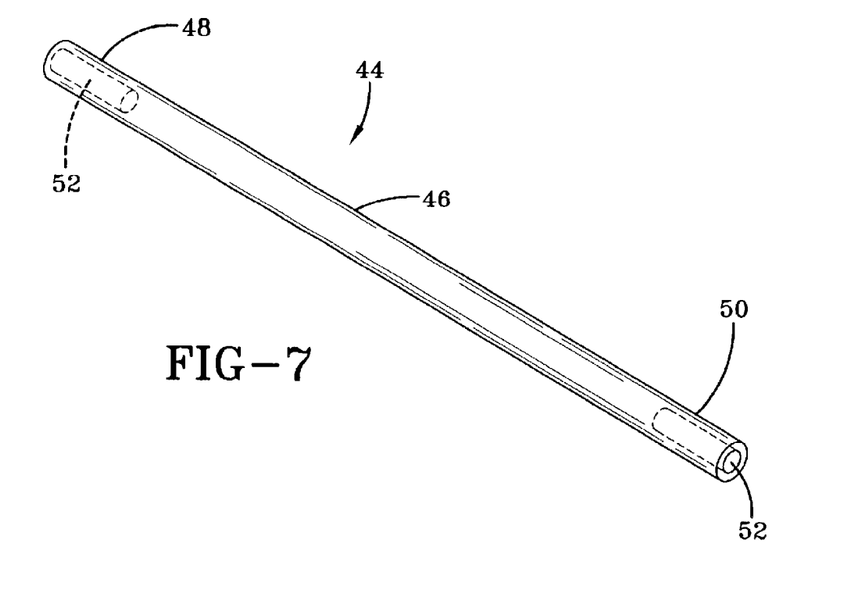
FIG. 7 is a perspective view of the handle utilized to remove and insert the magnetic inserts into and out of the tire mold.

With reference to FIG. 7, insert removal means is shown. The insert removal means provides for easy and quick changing of the inserts 34 from the upper mold half 12 and/or the lower mold half 14 of the tire press. One embodiment of the insert removal means is shown in FIG. 7. The insert removal means may be a tool 44 having a handle 46. The handle 46 has a first magnetized end 48 and a second magnetized end 50. Each magnetized end 48, 50 may have a light 52 operatively connected thereto. The light 52 provides for improved visual sighting of the recess so that the insert 34 can be easily positioned within the mold 10. The light 52 may be a flashlight, a pen light, or any other lighting means chosen with sound engineering judgment. The first magnetized end 48 may be utilized to attach the insert 34 into the recess 22. When the first magnetized end 48 is utilized to attach the insert 34, the magnetic force between the magnetic means 30 and the insert 34 should be stronger than the magnetic force between the insert 34 and the first magnetized end 48. This enables the magnetic means 30 to secure the insert 34 into the recess 22. Conversely, the second magnetized end 50 may be utilized to remove the insert 34 from the recess 22. As such, the magnetic force between the second magnetized end 50 and the insert 34 should be greater than the magnetic force between the insert 34 and the magnetic means 30 so that insert removal is possible. The tool 44 can be of any length necessary for an operator to access the recesses 22 in the upper mold half 12. Alternatively, the tool 44 can be made to have an adjustable length by any means chosen with sound engineering judgment such as a telescoping handle. Alternatively, the handle may be composed of various sections that can be threadably secured together or press fit together like a vacuum cleaner hose.

Figure 10:
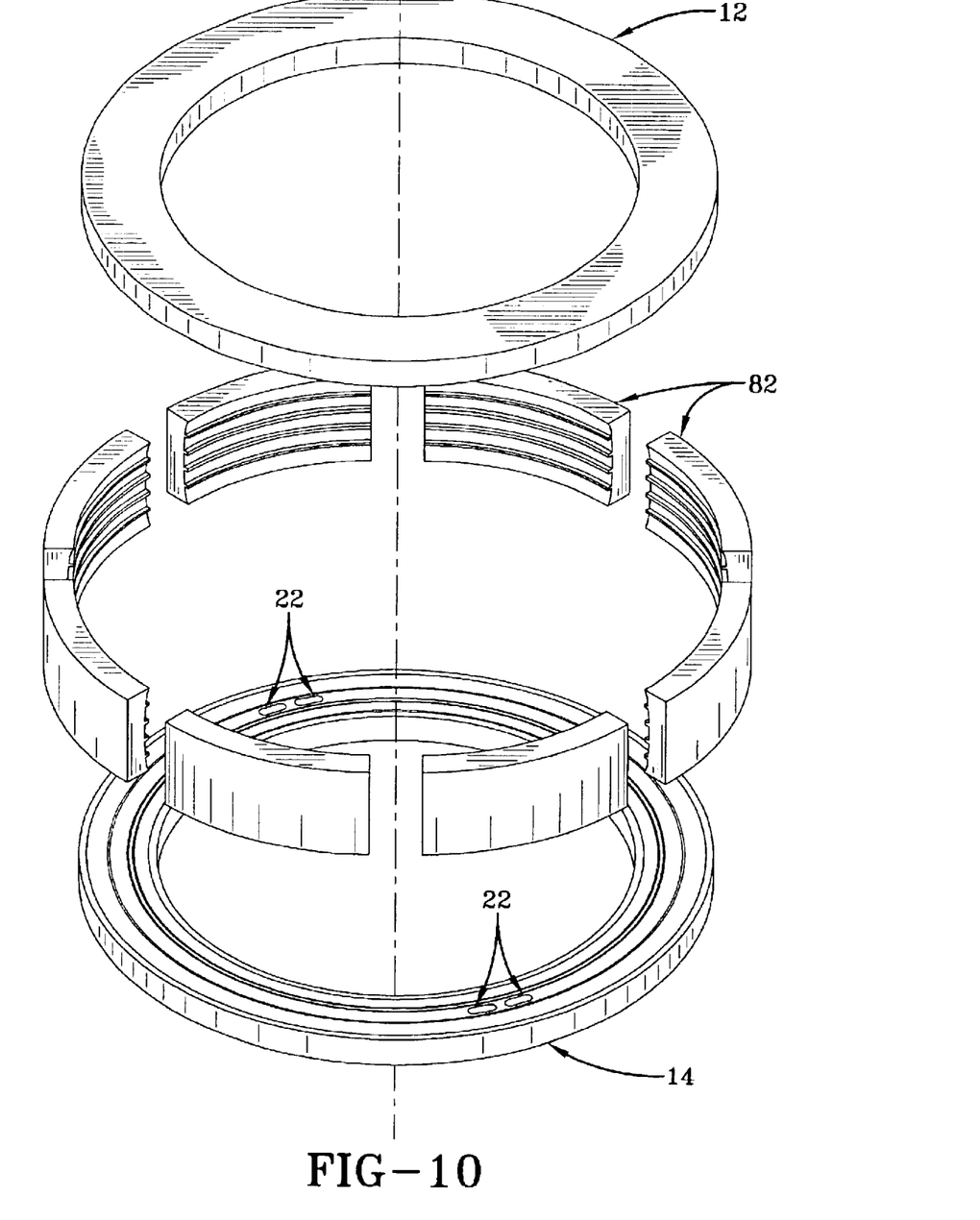
FIG. 10 is a perspective view of the present invention utilized with a segmented mold.

The present invention can also be used with any type of tire mold, such as a segmented mold 80 as shown in FIG. 10. The configuration of the recess 22 defined within the sidewall is identical to the two-piece mold described above. Magnetic means 30 are disposed within the recess 22 in order to secure the insert 34 having a TIN. It is important that the recess 22 be defined within one segment 82 of the mold 80, rather than traversing two segments 82, so that the magnetized insert 34 may remain securely in the recess 22 between curing cycles. The insert 34 may be positioned and removed with the insert removal means described above.

Figure 11:
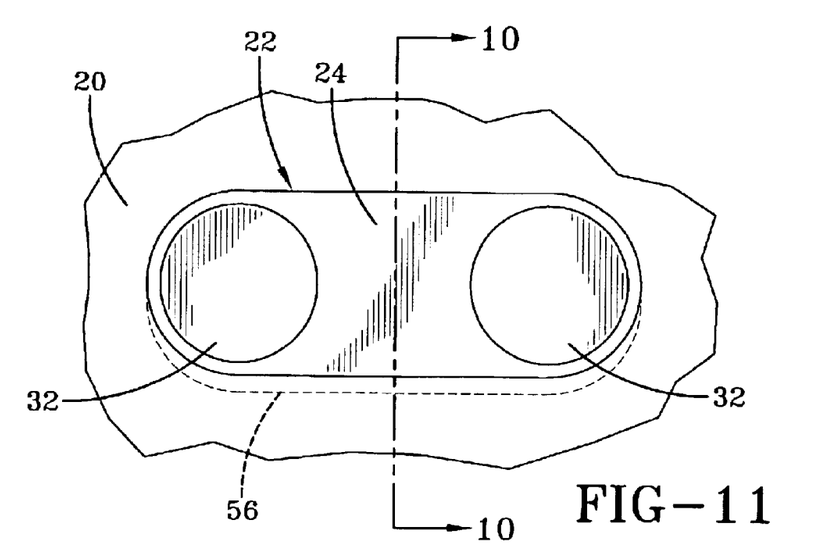
FIG. 11 is a top view showing a dovetailed edge in the recess.
Figure 12:
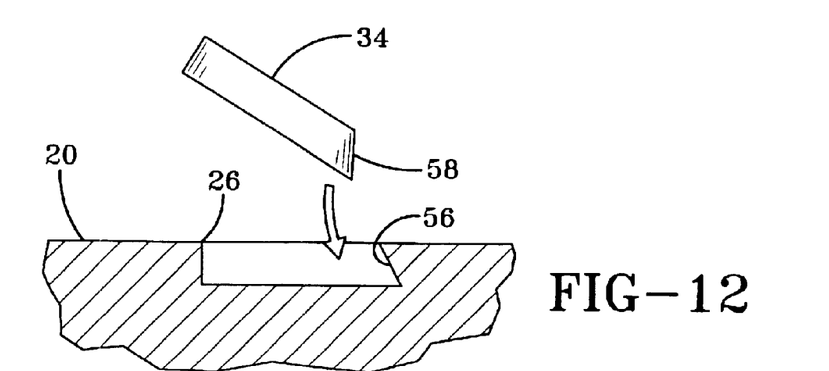
FIG. 12 is a cross-sectional view taken along line 10—10 of FIG. 11 and the magnetic insert with a dovetailed edge; and, FIG. 13 is another embodiment of the insert having an L-shaped dovetailed edge.
Figure 13:
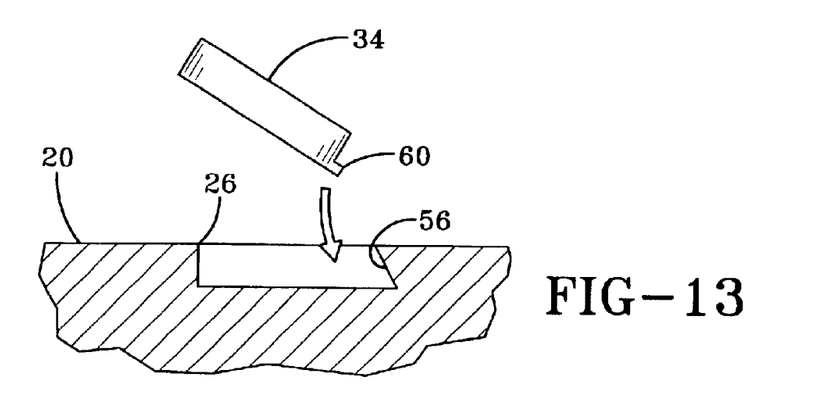

In yet another embodiment of the present invention, the recess 22 and the insert 34 may have a dovetail configuration to more securely hold the insert 34 within the recess 22, as shown in FIGS. 11–13. What is meant by the term "dovetail configuration," is the non-squared configuration of the insert 34 and recess 22 so that the joint formed by the insert 34 and the recess 22 has a tighter fit and is more secure. More specifically as shown in FIG. 12, one wall 56 of the recess 22 is angled or tapered to accommodate a geometrically matching insert 34. The insert 34 has a dovetailed edge 58, which engages the wall 56 of the recess. In this embodiment, the dovetailed edge 58 is a backward angle. In yet another embodiment, the dovetailed edge 58 may be L-shaped in cross section to form a lip 60, which is about 0.010 inches to 0.015 inches (0.254 mm to 0.381 mm) in length and depth, as shown in FIG. 13. When the L-shaped dovetailed edge 58 is utilized, the same recess as shown in FIG. 11 may be utilized to securely hold the insert 34 in place. Generally, because of the increased surface area with the dovetailed configuration, friction between the insert 34 and the recess 22 increases to hold the insert 34 in a more secure position.

A method for molding data onto a vulcanizable material will now be described. First, a mold 10 as described above is provided. The insert 34 is attached to the first magnetized end 48 of the tool 44. Next, the insert 34 is selectively attached within the recess 22 in one of the mold halves by means of the first magnetized end 48 of the tool 44. The insert is secured into the recess 22 via the magnetic means 30, such that, the insert 34 is substantially flush with the sidewall 20 of the two-piece tire mold 10. The insert 34 remains in the recess 22 because the magnetic force between the magnets 32 and the insert 34 is greater than the magnetic force between the insert 34 and the first magnetized end 48. The steps are then repeated for positioning another insert 34 into the other mold half. Next, the mold 10 is closed and then the vulcanizable material is cured. As a result, the data 40, on the insert 34, namely the mandated United States Department of Transportation information, is imprinted onto the vulcanizable material. Because an insert 34 is present in both the upper mold half 12 and the lower mold half 14, the data 40 is imprinted onto both sides of the tire 54. After the mold is opened, the insert 34 may be removed from both mold halves by utilizing the second magnetized end 50 of the tool 44. Because the magnetic force between the insert 34 and the second magnetized end 50 is greater than the magnetic force between the insert 34 and the magnets 32, the insert 34 is easily and quickly removed. The insert 34 should be changed as often as required so that the United States Department of Transportation information is correct. For example, since United States Department of Transportation requires the date of manufacture to be imprinted onto the tire 54, the insert 34 should be changed weekly so that the correct date is imprinted onto the tire 54.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An article, comprising:
    a mold having a wall with a recess defined therein, said recess having a floor with at least one cavity defined in said floor, said wall having a cavity side and an exterior side, said wall having a hole extending from said cavity side through said exterior side, said hole being concentric with said at least one cavity; and,
    magnetic means attached to said wall within said cavity, said magnetic means being flush with said recess floor, wherein an associated insert is adapted to be selectively held within said recess via said magnetic means such that the insert is substantially flush with said wall.

2. The article of claim 1, wherein said magnetic means is at least one magnet.

3. The article of claim 1, wherein said insert further comprises data integrally formed therewith, said data adapted to be imprinted into an associated vulcanizable material.

4. The article of claim 1, wherein said mold comprises an upper half and a lower half.

5. The article of claim 4, wherein said upper half and said lower half each have said recess with magnetic means to receive said insert.

6. The article of claim 5, wherein said insert positioned in said upper mold half and said lower mold half is removable through an elongated handle having a magnetized end.

7. The article of claim 1, wherein said insert is made from a magnetic material.

8. The article of claim 1, wherein said mold is a tire mold.

9. The article of claim 1, further comprising a rod, said rod adapted to be inserted in said hole through said exterior side of said wall to selectively remove said magnetic means.

10. A tire mold system, comprising:
    a tire mold having:
        a sidewall having a recess;
        at least one magnet operatively connected to said sidewall within said recess; and,
        a selectively removable insert adapted to be securely positioned within said recess via said magnet such that said insert is substantially flush with said sidewall, said insert having data to be imprinted on an associated tire during a curing cycle;
    insert removal means adapted to position and remove said insert from said recess, said insert removal means having a handle with first and second magnetized ends, wherein the magnetic force of said first end is less than the magnetic force between said magnet and said insert and the magnetic force of said second end is greater than the magnetic force between said magnet and said insert.

11. The tire mold system of claim 10, further comprising an upper mold half and a lower mold half, said upper and lower mold halves each having a magnetized recess for receiving said insert, such that data can be imprinted on both sides of the tire.

12. The tire mold system of claim 10, wherein said recess is elongated and arcuate, said recess having two holes, wherein each hole receives a magnet.

13. The tire mold system of claim 10, wherein said recess and said insert define a dovetailed configuration to further secure said insert in said recess.

14. A tire mold system for molding a tire identification number onto a tire, the tire having two sidewalls, the system, comprising:
    a two-piece tire mold having an upper mold half and a lower mold half, each of said mold halves comprising:
        a sidewall with an elongated recess defined therein, said recess having an edge and a depth, said recess having two circular cavities defined therein;
        two magnets operatively connected to said sidewall within said cavities, said magnets being at least 0.5 inches (1.27 cm) apart; and,
        an insert selectively and interchangeably connectable to said sidewall via said magnets, said insert having a depth substantially equal to the depth of said recess such that said insert is flush with said edge of said recess when said insert is positioned in said recess, said insert having DOT data to be imprinted onto the two sidewalls of the tire, said insert being fabricated from 410 stainless steel; and,
    insert removal means adapted to position and remove said insert from said recess, said insert removal means having a handle with first and second magnetized ends, wherein the magnetic force of said first end is less than the magnetic force between said magnets and said insert and the magnetic force of said second end is greater than the magnetic force between said magnets and said insert.

* * * * *